(12) United States Patent
Finnemore (10) Patent No.: US 6,260,607 B1
(45) Date of Patent: Jul. 17, 2001

(54) AIR PREHEATER SECTOR PLATE DRIVE

(75) Inventor: Harlan E. Finnemore, Pocatello, ID (US)

(73) Assignee: ABB Air Preheater, Inc., Wellsville, NY (US)

( * ) Notice: Subject to any disclaimer, the term of this patent is extended or adjusted under 35 U.S.C. 154(b) by 0 days.

(21) Appl. No.: 09/399,250

(22) Filed: Sep. 20, 1999

(51) Int. Cl.⁷ .................................................... F23L 15/02
(52) U.S. Cl. ................................... 165/9; 165/8; 165/10
(58) Field of Search .................. 165/4, 6, 8, 9, 165/10

(56) References Cited

U.S. PATENT DOCUMENTS

| | | | |
|---|---|---|---|
| 3,250,316 | * 5/1966 | Nyberg | 165/9 |
| 4,298,055 | 11/1981 | Ritter | 165/9 |
| 4,669,531 | * 6/1987 | Cande | 165/9 X |
| 5,727,617 | 3/1998 | O'Boyle | 165/9 |
| 6,155,209 | * 12/2000 | Finnemore | 165/9 X |

FOREIGN PATENT DOCUMENTS

| | | |
|---|---|---|
| 0933610 A1 | 8/1999 | (EP) . |
| 0166292 | * 7/1987 | (JP) ................ 165/9 |
| 0802715 | * 2/1981 | (SU) ................ 165/9 |

OTHER PUBLICATIONS

International Search Report for International Application No. PCT/US 00/22569

* cited by examiner

*Primary Examiner*—Christopher Atkinson
(74) *Attorney, Agent, or Firm*—Alix, Yale & Ristas, LLP (57) ABSTRACT

Drive means are provided to move the sector plates of rotary regenerative air preheaters into sealing position with the radial seals on the rotor during rotor turndown. A pair of fluid drive cylinders are connected to a pair of drive chains which rotate a drive shaft. One of the pair of drive cylinders may operate in the extend mode while the other operates in the retract mode or both cylinders may operate in the same mode at the same time for increased force in one direction. Eccentric disk devices are attached to the drive shaft and to the sector plates for converting the rotary motion of the shaft to linear motion of the attachment to the sector plates. The eccentric disk devices may contain two eccentric disks so that the distance of travel can be adjusted.

18 Claims, 10 Drawing Sheets

AIR PREHEATER SECTOR PLATE DRIVE

BACKGROUND OF THE INVENTION

The present invention relates to rotary regenerative air preheaters having sector plates dividing the air preheater into a gas sector and one or more air sectors and having radial seals which cooperate with the sector plates to reduce the leakage between the air preheater sectors. More particularly, the invention relates to sector plate drive means for adjusting the position of the sector plates relative to the radial seals.

A rotary regenerative air preheater transfers sensible heat from the flue gas leaving a boiler to the entering combustion air through regenerative heat transfer surface in a rotor which turns continuously through the gas and air streams. The rotor, which is packed with the heat transfer surface, is divided into compartments by a number of radially extending plates referred to as diaphragms. These compartments are adapted to hold modular baskets in which the heat transfer surface is contained.

The air preheater is divided into a flue gas side or sector and one or more combustion air sides or sectors by sector plates. Flexible radial seals on the rotor, usually mounted on the top and bottom edges of the diaphragms, are in close proximity to these sector plates and minimize leakage of gas and air between sectors. In a typical rotary regenerative heat exchanger, the hot flue gas and the combustion air enter the rotor shell from opposite ends and pass in opposite directions over the heat exchange material housed within the rotor. Consequently, the cold air inlet and the cooled gas outlet are at one end of the heat exchanger, usually the bottom and referred to as the cold end, and the hot gas inlet and the heated air outlet are at the opposite end of the heat exchanger, usually the top and referred to as the hot end. As a result, an axial temperature gradient exists from the hot end of the rotor to the cold end of the rotor. In response to this temperature gradient, the rotor tends to distort and to assume a shape similar to that of an inverted dish (commonly referred to as rotor turndown). As a result, the radial seals mounted on the top edges of the diaphragms are pulled away from the sector plates with the greater separation occurring at the outer radius of the rotor. This opens a gap permitting the undesired intermingling of the gas and the air.

Various schemes have been developed to maintain the seal between the radial seals mounted on the diaphragms and the sector plates during this temperature change. It is well known that rotary regenerative air preheaters utilize a flexible sealing member that extends across the gap between the diaphragms and the sector plates. As the rotor transitions from a cold, non-operating condition to a hot, operating condition, the temperature gradient along the rotor increases, and the gap between the hot end diaphragms and the sector plates increases. These flexible sealing members are designed to maintain contact with the sector plate.

However, these seals are subject to a number of problems. It has been experienced that the continuous contact between the sealing member and the sector plates results in wear to both the sealing member and the sector plates. Special liners are sometimes utilized to reduce sealing surface wear. However, use of such liners results in higher capital and labor costs. Further, those seals are subject to premature failure due to flexure and edge fracturing. Finally, the amount of gap that may be closed by these seals is limited.

SUMMARY OF THE INVENTION

The present invention provides an arrangement of means in an air preheater for maintaining a controlled gap between the radial seals and the sector plates at full operating temperature to reduce leakage. The present invention provides improved sector plate drive means to move the outer ends of the sector plates as the temperature increases so as to maintain the sector plates engaged with or in close proximity to the radial seals. Specifically, a pair of fluid drive cylinders are connected to and rotate a drive belt system to in-turn rotate a drive shaft. The motion of the rotating drive shaft is converted to reciprocating motion by motion translators on the drive shaft. This reciprocating motion is transferred to the sector plates. The motion translators may be adjustable to control the travel distance of the sector plates.

DESCRIPTION OF THE PREFERRED EMBODIMENTS

Figure 1:
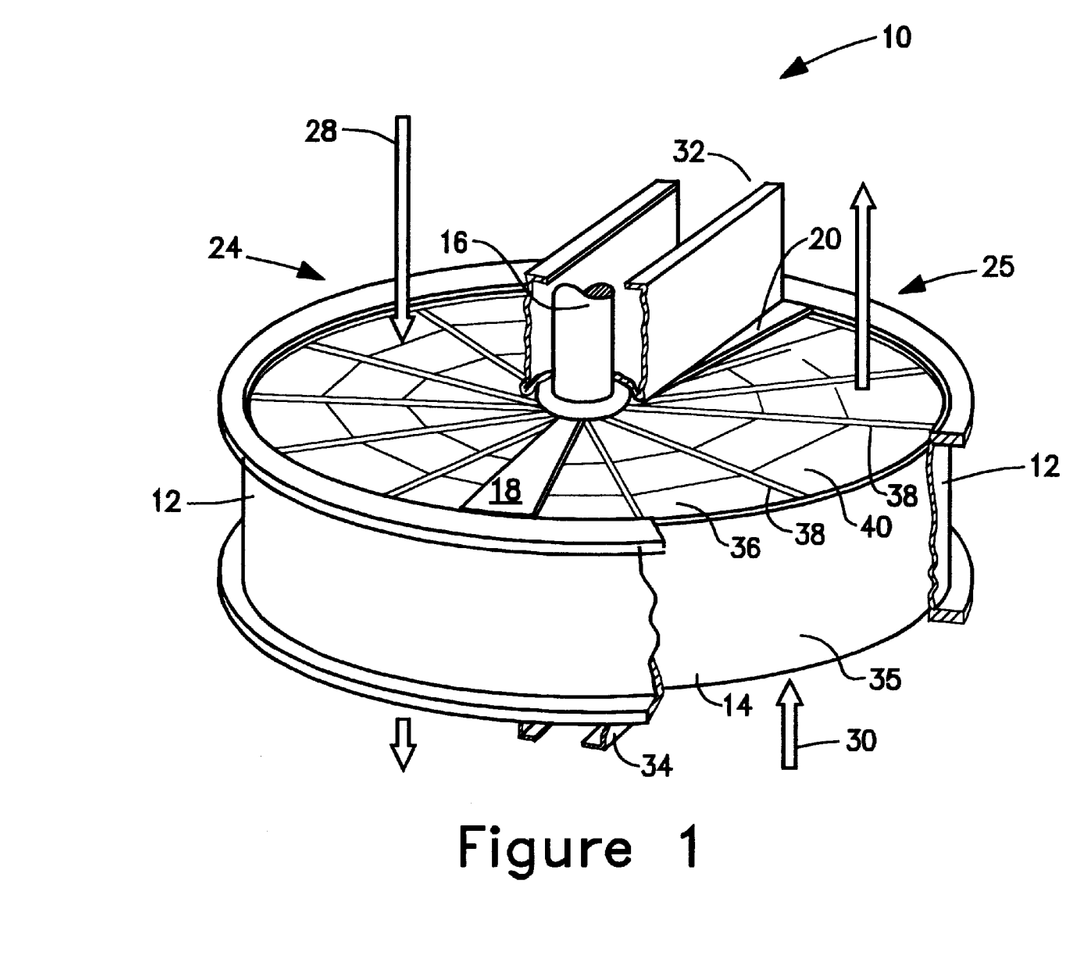
FIG. 1 is a general perspective view of a conventional rotary regenerative air preheater.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 24 and an air sector 25. Corresponding sector plates are also located on the bottom of the unit. The hot flue gases enter the air preheater 10 as indicated by the arrow 28, flow through the flue gas sector 24 where heat is transferred to the heat transfer surface in the rotor 14. As this hot heat transfer surface then rotates through the air sector 25, the heat is transferred to the air flowing through the rotor from the bottom as indicated by the arrow 30. Consequently, the cold air inlet and the cooled gas outlet define a cold bottom end and the hot gas inlet and the heated air outlet define a hot top end. Located on the top end of the housing is the hot end center section 32 with a corresponding cold end center section 34 on the bottom end. The rotor 14 has a shell 35 and is divided into a plurality of pie-shaped compartments 36 by the diaphragm plates 38 with each compartment containing a plurality of heat exchange basket modules 40.

Figure 2:
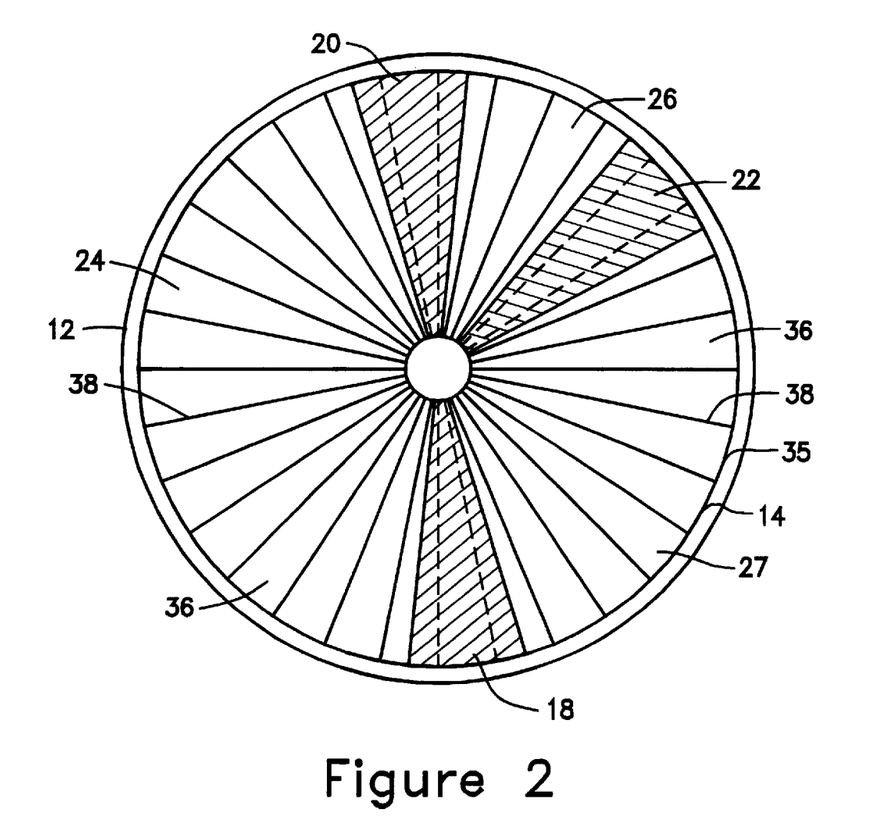
FIG. 2 is a simplified top view of a trisector air preheater showing the rotor in the housing and showing the sector plates.
Figure 3:
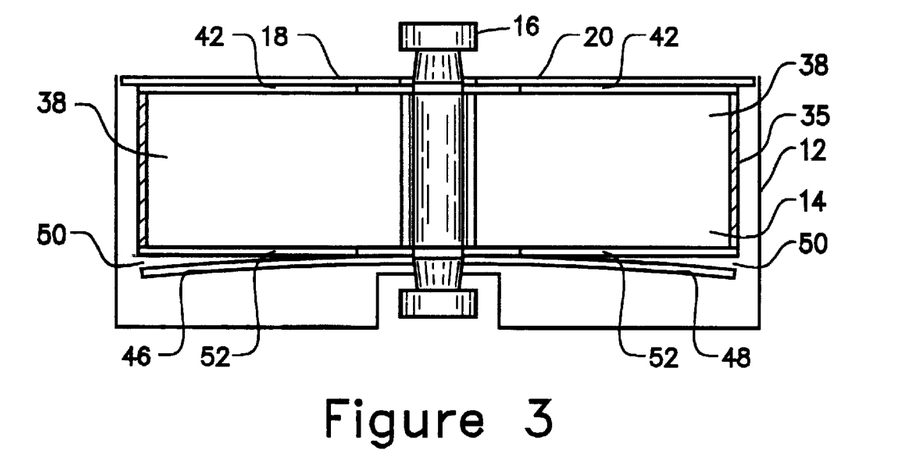
FIG. 3 is a diagrammatic representation of a rotary regenerative heat air preheater in the cold state.
Figure 4:
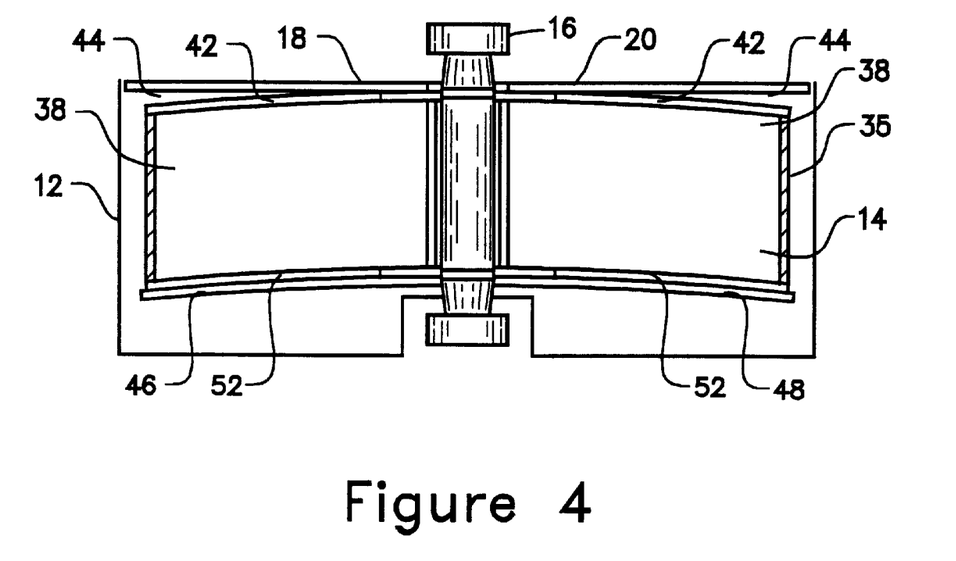
FIG. 4 is a diagrammatic representation similar to FIG. 3 showing rotor turndown.

FIG. 2 is a plan view representation of a trisector air preheater comprising the rotor housing 12 and the rotor 14. The housing is divided in this case into three sectors by the sector plates 18, 20 and 22. The sectors are the flue gas sector 24 and the air sector which is divided into the primary air sector 26 and the secondary air sector 27. This figure illustrates the sector plates in cross-section for purposes of clarity. The rotor 14 is composed of the shell 35 and the diaphragm plates 38 dividing the rotor into compartments 36. Attached to the top and bottom edges of these diaphragm plates 38 are the radial seals. When the air preheater 10 is put into service, the rotor is cold and the relationship of the rotor to the sector plates is depicted in FIG. 3. This figure shows the rotor housing 12, the rotor 14 composed of the rotor shell 35 and the diaphragm plates 38 and the sector plates 18 and 20. On top of the diaphragm plates 38 are the radial seals 42 which will be shown in some more detail in later figures but which may be of any conventional radial seal design. As can be seen in this FIG. 3, the radial seals 42 are engaging or in close proximity to the sector plates to form the desired seal. As the moving rotor progresses from a cold non-operating condition to a hot operating condition, an axial temperature gradient develops from the hot top end of the rotor to the cold bottom end of the rotor as a result of heat exchange between the counter-flowing air and gas streams. This axial temperature gradient causes the rotor 14 to distort such as shown in FIG. 4. This is referred to as rotor turndown. As a result, the radial seals 42 mounted on the hot end of the diaphragm plates 38 are pulled away from the sector plates with the greater separation occurring at the periphery of the rotor 14. This opens a gap 44 between the radial seals and the sector plates which would allow flow between sectors, resulting in an undesired intermingling of the gas and air. By contrast, the sector plates 46 and 48 on the bottom cold end are shaped and mounted to start out in the cold condition with a preadjusted gap 50 at the periphery between the sector plates 46 and 48 and the radial seals 52 as seen in FIG. 3. As the rotor is heated and rotor turndown occurs, this gap 50 is closed as shown in FIG. 4.

Figure 5:
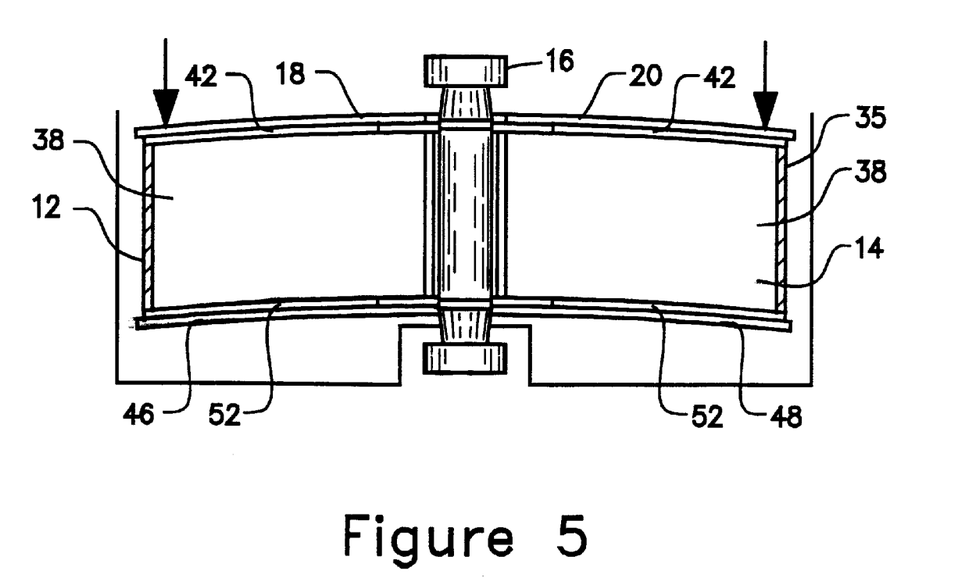
FIG. 5 is a further diagrammatic representation similar to FIG. 4 but with the sector plate adjusted in accordance with the present invention.

In accordance with the present invention, the hot end sector plates are driven so that the peripheral ends of the sector plates move toward the rotor to close the gap 44 created by rotor heating and turndown. This is illustrated in FIG. 5 where it can be seen that the outer ends of the sector plates 18 and 20 have been forced downwardly back into contact with the radial seals 42.

Figure 6:
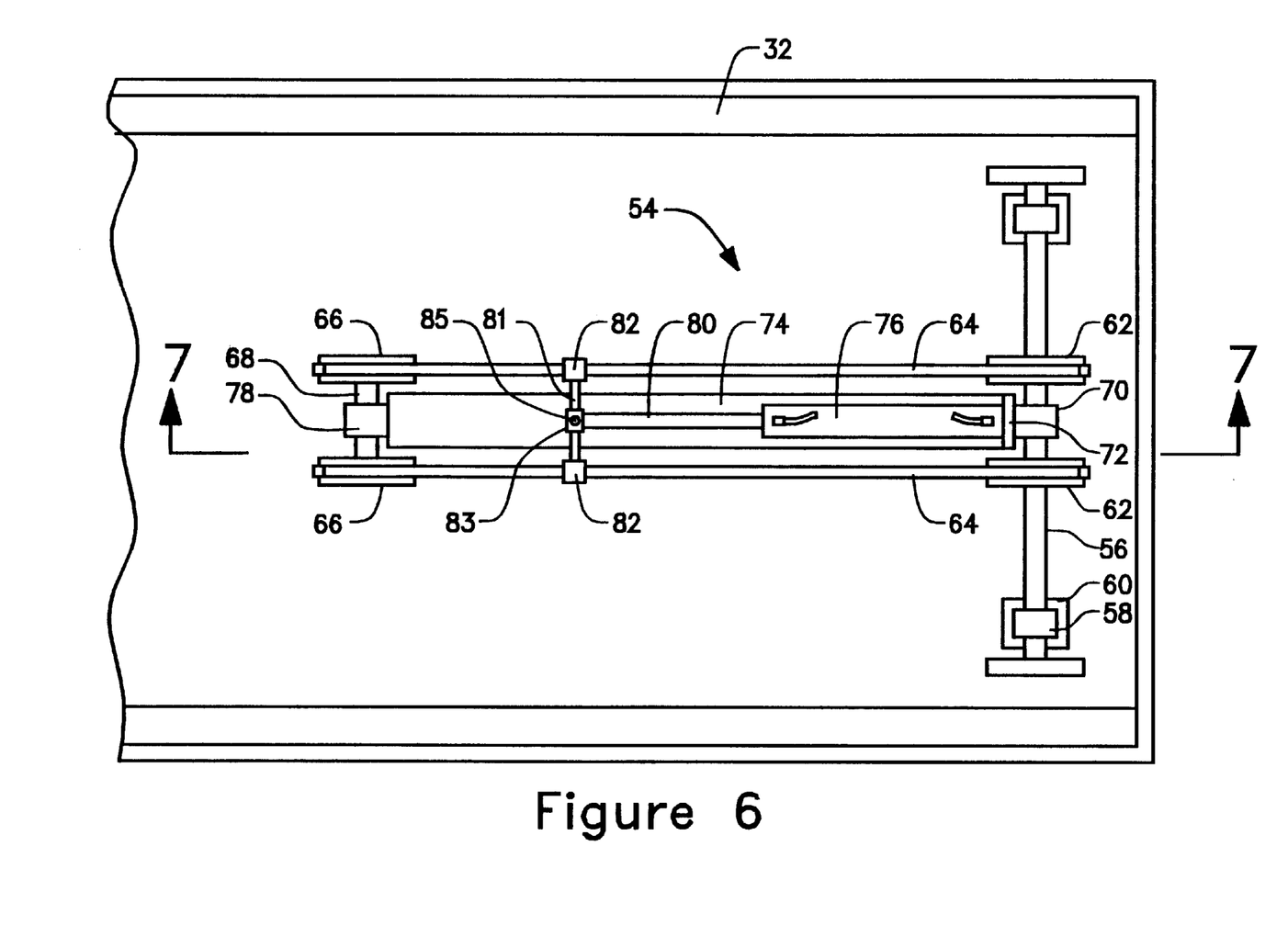
FIG. 6 is a top view of the sector plate drive assembly of the invention.
Figure 7:
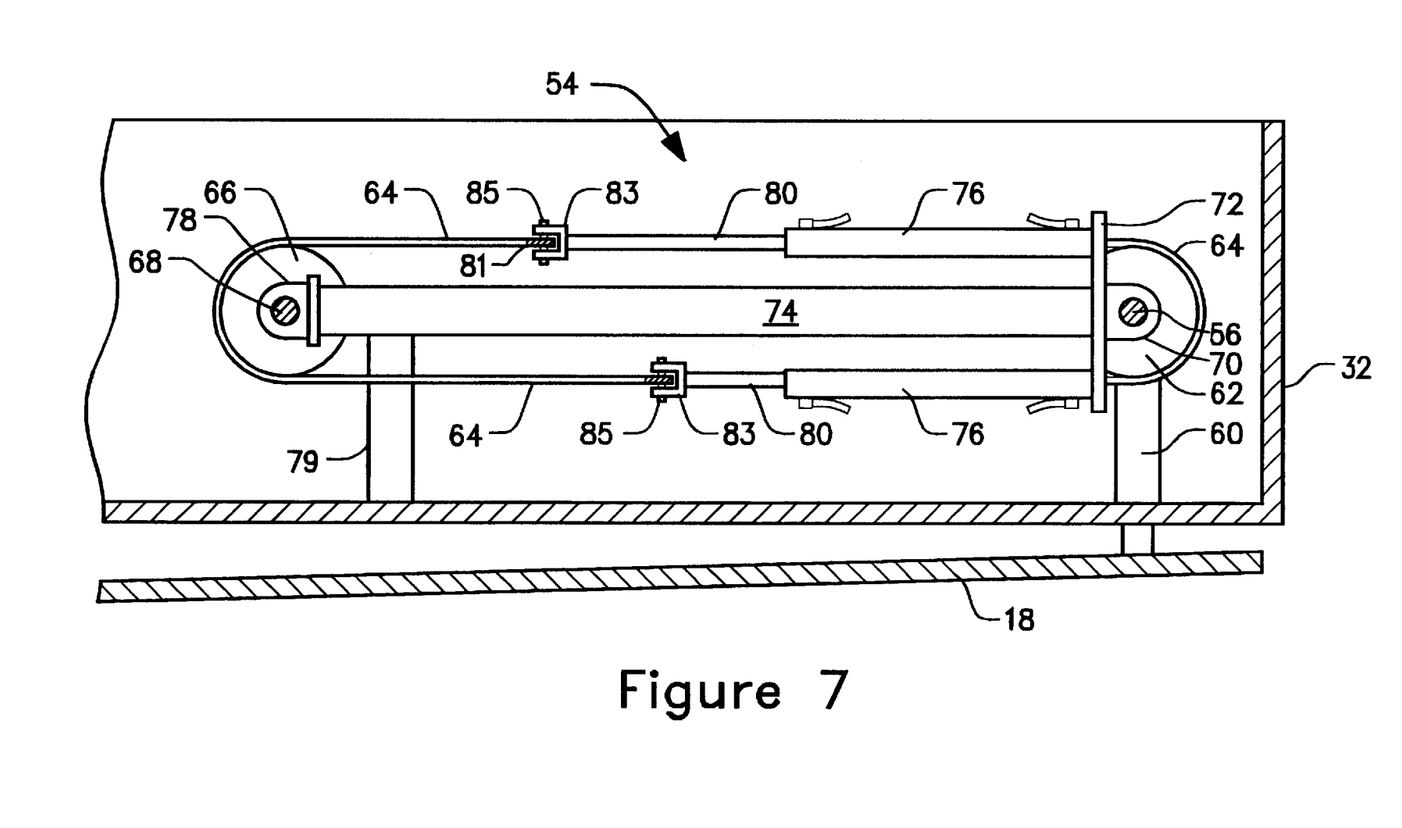
FIG. 7 is a side view taken along line 7—7 of FIG. 6.
Figure 8:
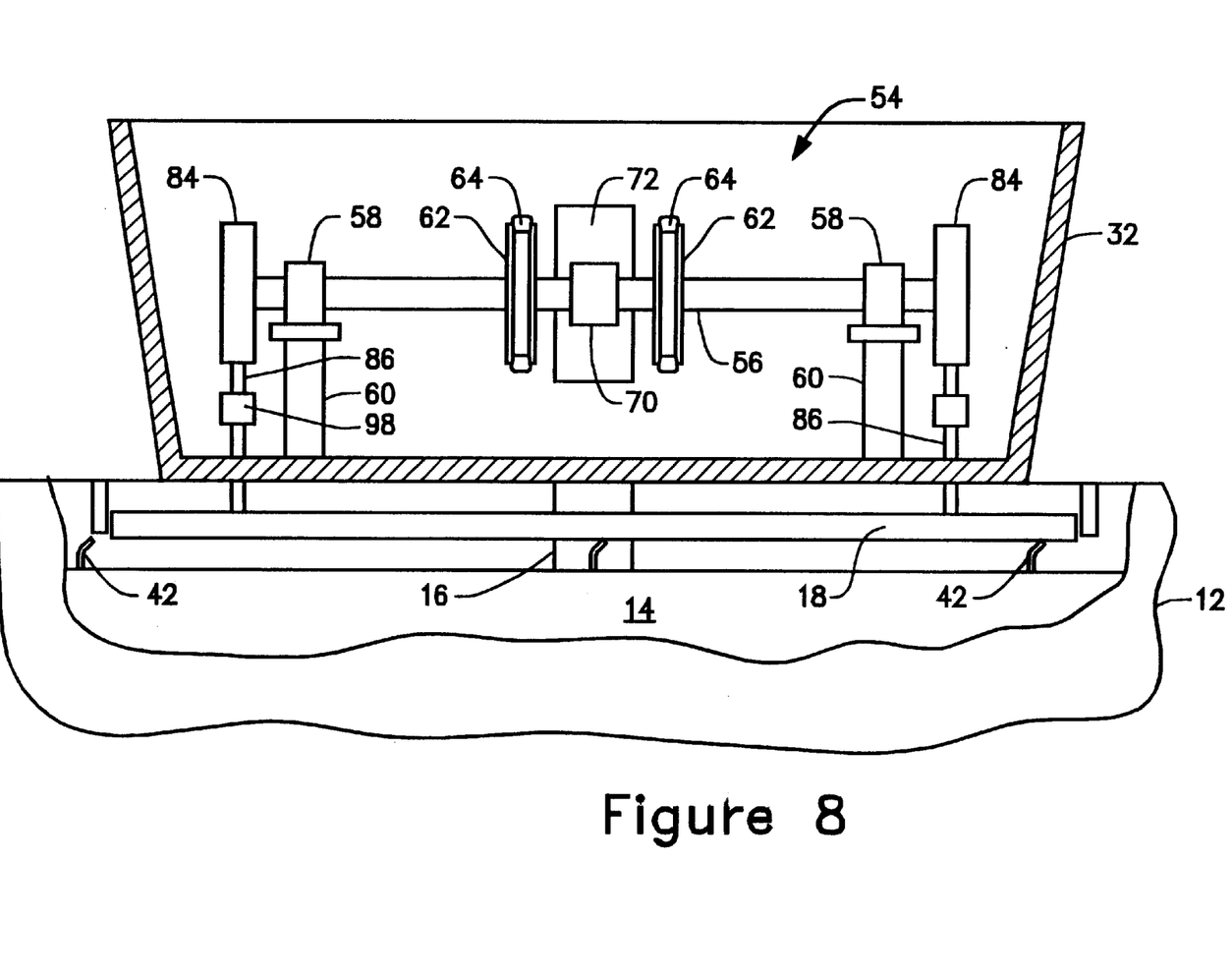
FIG. 8 is an end view of the sector plate drive assembly taken from the right side of FIG. 7.

Turning now to the details of the sector plate drive of the present invention and referring to FIGS. 6, 7 and 8, the drive assembly generally designated 54 is shown mounted in the hot end center section 32. A drive shaft 56 is mounted in the bearings 58 which are supported on the pedestals 60. Mounted on the drive shaft 56 are two drive wheels 62 which are rotationally fixed to the drive shaft such as by keys. These drive wheels are rotated by the two drive belts 64. The term belts is used generically herein to include such things as chains and cables. Preferably, the drive wheels are sprocket wheels and the drive belts are chains. Alternately, the wheels and belts can be sheaves and cables. Further references will be made to chains and sprocket wheels. The other ends of the drive chains are mounted to the idler sprocket wheels 66 on the idler shaft 68. On the drive shaft 56 between the drive sprocket wheels 62 is a bearing 70 which is attached to a support plate 72. Attached to the support plate 72 is a support beam 74 and two drive cylinders 76. The other end of the support beam 74 is attached to the idler shaft 68 by the idler bearing 78. Because the support beam 74 may be rotated about the drive shaft, the other end of the support beam may be attached to the air preheater structure in any convenient position by the tie-down support 79. Each of the two cylinder rods 80 of the two drive cylinders 76 are attached to the two drive chains 64. A bar 81 extends between and is clamped to the chains at 82. A fitting 83 on the end of the cylinder rod 80 is pinned at 85 to the bar 81. The two drive cylinders 76, which may be hydraulic or pneumatic, are connected to simultaneously reciprocate the two cylinder rods 80 in opposite directions. As can be seen from the drawings, that will drive the two chains together around the loop, first in one direction and then the other direction. Likewise, that will rotate the drive sprocket wheels 62 and the drive shaft 56 first in one direction and then the other. The travel of the rods 80 and the diameter of the drive sprocket wheels 62 are selected to rotate the drive shaft 56 through 180°.

The arrangement of the two chains with the drive cylinders between the chains and on the operating plane of the chains and the pinned connections to the chains avoids any eccentric loading of the cylinders and avoids wear on the seals and bending of the cylinder rods. If only a single chain and sprocket were used, the operating cylinders would need to be located directly on the axis of the chain. That would mean that the cylinder rod would essentially be an extension of the chain and there could be no idler sprocket. Therefore, the two separate cylinders would be required each in turn to accept the full load as opposed to the arrangement of the invention where each cylinder is double acting and assists the other. This would require that the cylinders be attached to some external structure and the load to the chain would be applied in a retracting direction only since the chain is flexible. In that situation, each cylinder would require twice the pressure area to duplicate the force of the present invention as each cylinder would be required to operate completely independent of the other. Also, they would operate in the retract direction which is the direction with the least available cylinder area exposed to pressure due to the area occupied by the rod. In addition to the above, great bending loads would be transmitted to the drive shaft 56 due to the distance between bearings 58 and subsequently to the bearings 58 themselves and mounting bases 60. This would in turn require larger structures for these components and a larger external structure to restrain the forces of the cylinders. Therefore, the drive arrangement of the present invention has distinct advantages.

Figure 9:
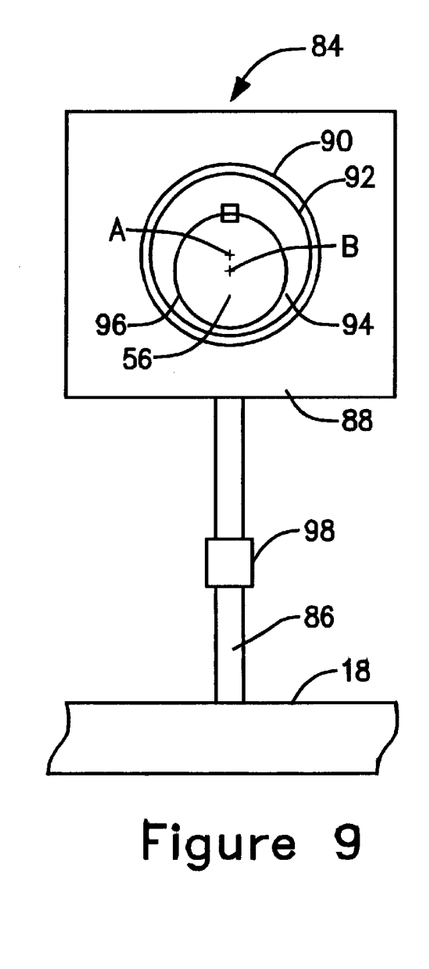
FIGS. 9 and 9A are detailed end views of an eccentric disk device shown in two different operating positions for translating the rotary shaft motion to reciprocating motion and showing the connection to the sector plate.
Figure 9A:
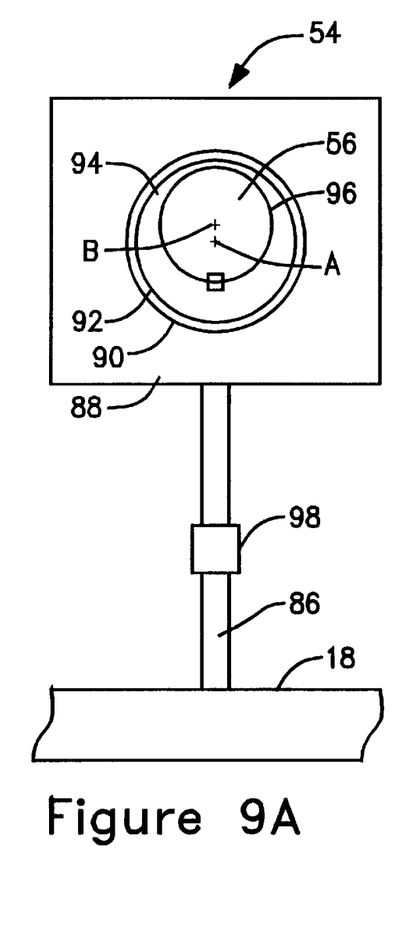

Attached on each end of the drive shaft 56 are eccentric disk devices 84 for converting the rotary motion of the drive shaft 56 into the reciprocating motion of the tie rods 86 which connect the eccentric disk devices 84 to the sector plate 18. As shown in FIG. 9, the eccentric disk device 84 comprises a mounting block 88 having a circular opening 90 lined with a bushing 92. Rotatably mounted inside the bushing 92 is a circular disk 94 with a center A having a circular opening 96 with the center of the opening B offset from the center A of the disk. The offset distance is one half of the desired distance of travel of the sector plate. Extending through and keyed into the circular opening 96 is the drive shaft 56 also with the center B. When the drive shaft 56 is rotated 180° to the position shown in FIG. 9A, the disk 94 is also rotated 180°. Since the center of rotation B of the drive shaft 56 coincides with the center of rotation of the disk 94 which is offset from the center A of the disk 94, the motion of the periphery of the disk 94 is eccentric which reciprocates the entire mounting block 88 to the down position in FIG. 9A. Therefore, the tie rods 86 move the outer ends of the sector plates 18 up and down a distance equal to twice the offset. The tie rods 86 are preferably in two pieces held together by sleeve nuts 98 to permit the fine adjustment of the elevation and the leveling of the sector plates.

Figure 10:
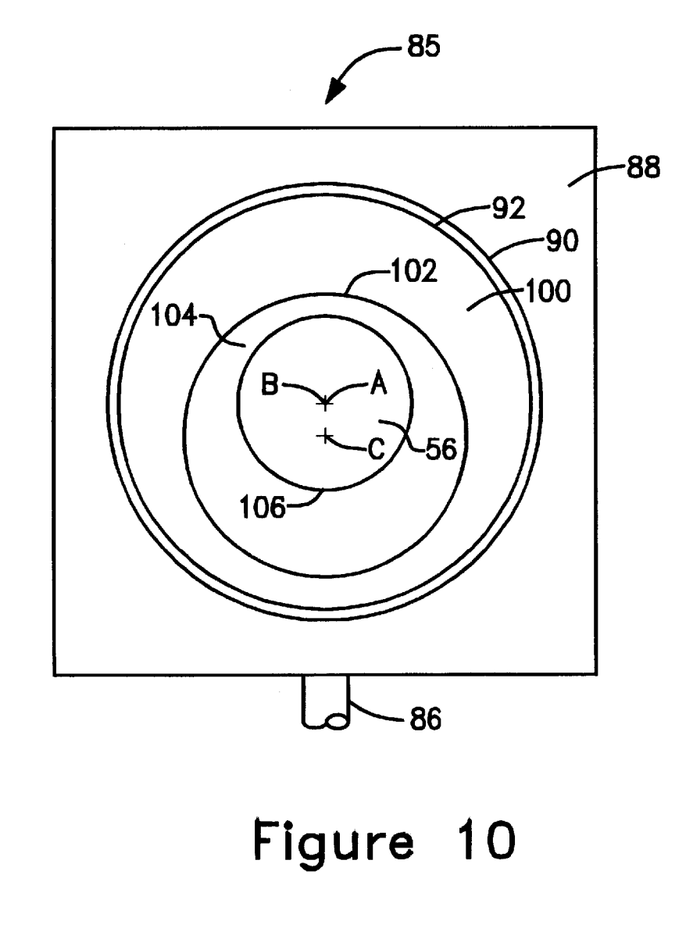
FIGS. 10, 11 and 12 illustrate three different adjustment positions for an alternate adjustable eccentric disk device.
Figure 11:
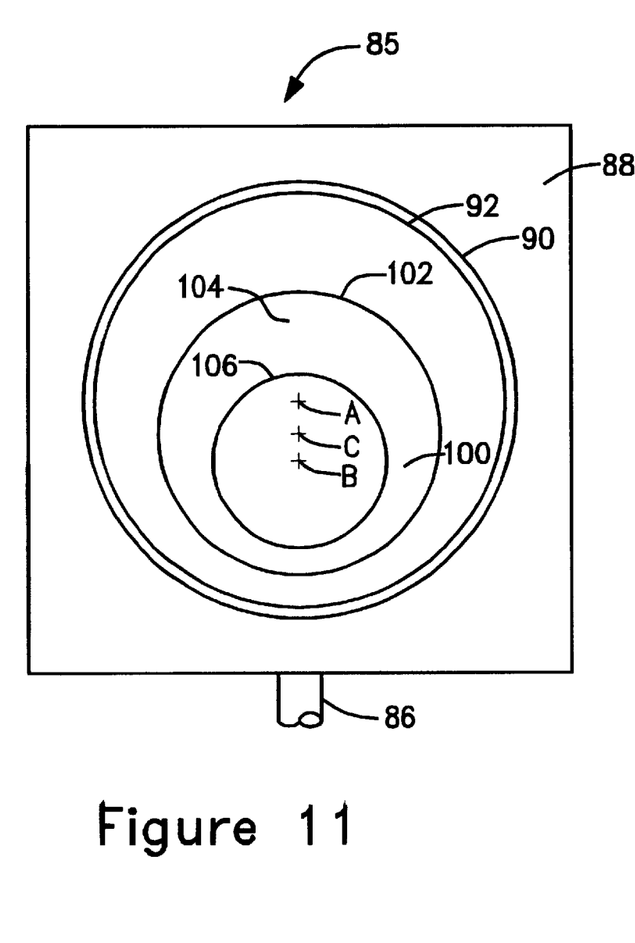
Figure 12:
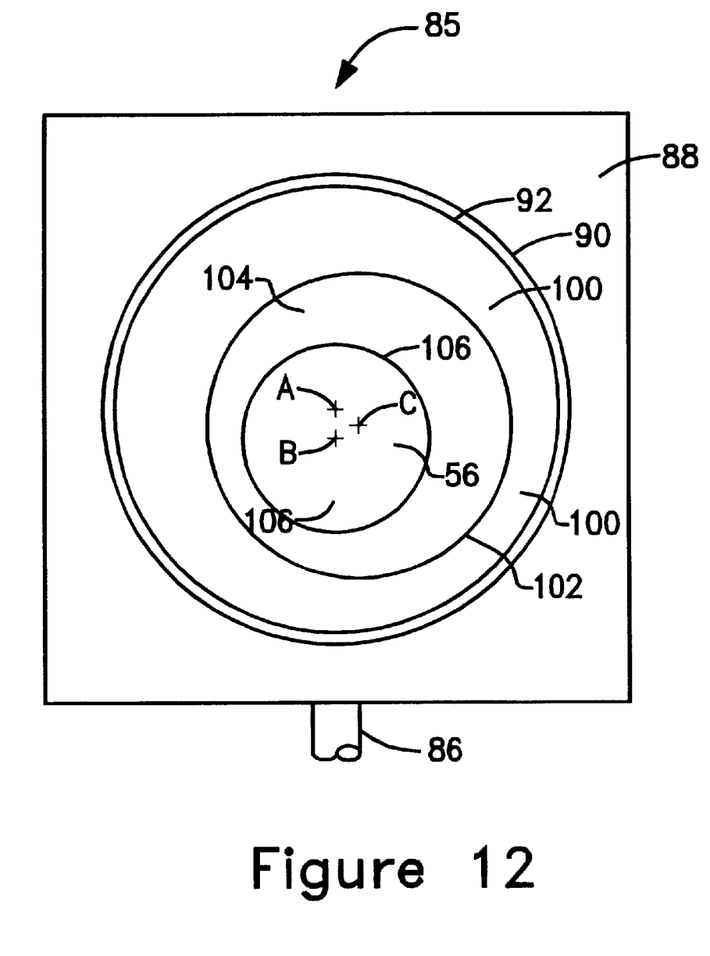

An alternate eccentric disk device 85 is shown in FIGS. 10, 11 and 12. This is a nested or superimposed, two-disk device which may be adjusted to set the desired distance of travel of the sector plate. In this arrangement, there is a large disk 100 with a center A and opening 102. Nested in the opening 102 of the larger disk 100 is the smaller disk 104 with a center C. This smaller disk 104 has a shaft opening 106 with a center B which is also the center of the shaft. The center of the opening in each disk is offset from the center of that disk a distance set at one quarter of the desired maximum distance of travel of the sector plate. With this arrangement, the total travel of the mounting block 88 can be adjusted anywhere from zero to two times the sum of the offsets. In FIG. 10, the disks are nested and fixed together (such as by tack welding) such that the center A of the large disk 100 and the center B of the opening 106 and the shaft 56 coincide. Therefore, rotation of the shaft around its center B also rotates the disk 100 around its center A producing no vertical movement of the block 88. In contrast, in FIG. 11, the disk 104 is nested in disk 100 and fixed in position such that the center B of the opening 106 and thus the center of the shaft are no longer coincident with the center A of the disk 100. Instead, the center B is now on the opposite side of the center C from the center A. This arrangement provides the maximum movement of the sector plate and the distance of movement is equal to twice the distance from center A to center B.

To further illustrate the adjustability, reference is made to FIG. 12 which shows an intermediate adjustment. In this example, the disk 100 has been rotated counterclockwise 45° around the disk 194 and the disk 104 has been rotated clockwise 45° around the shaft 56. This reduces the distance from A to B by 50% compared to FIG. 11 and thereby reduces the movement of the sector plate by 50%. By rotating the larger disk in one direction around the smaller disk and the smaller disk around the shaft in the opposite direction, the center of the shaft 56 can be maintained in alignment with the load through the rod 86. Therefore, since the smaller disk 104 needs to be rotatably adjusted on the shaft 56, a single position keyed arrangement is not used. Instead, locking devices such as collars or tapered sleeves can be use. To facilitate adjustment, index marks for various travel distances would be provided between the shaft and smaller disk and between the smaller and larger disks.

With the arrangement of drive cylinders 76 as described thus far, the bases of the drive cylinders are at the same end. As one cylinder is activated to extend, the other is activated to retract. Because the cylinder rods 80 occupy a percentage of the available area in the drive cylinders against which the operating fluid operates, the force the cylinder is capable of delivering at a given pressure of operating fluid is less while retracting than while extending. As a consequence, for the arrangement shown, an equal rotational force is applied to the sprocket wheels in both rotational directions as one cylinder is always retracting while the other is extending. On horizontally mounted air preheaters this would be the most likely orientation of cylinders.

Figure 13:
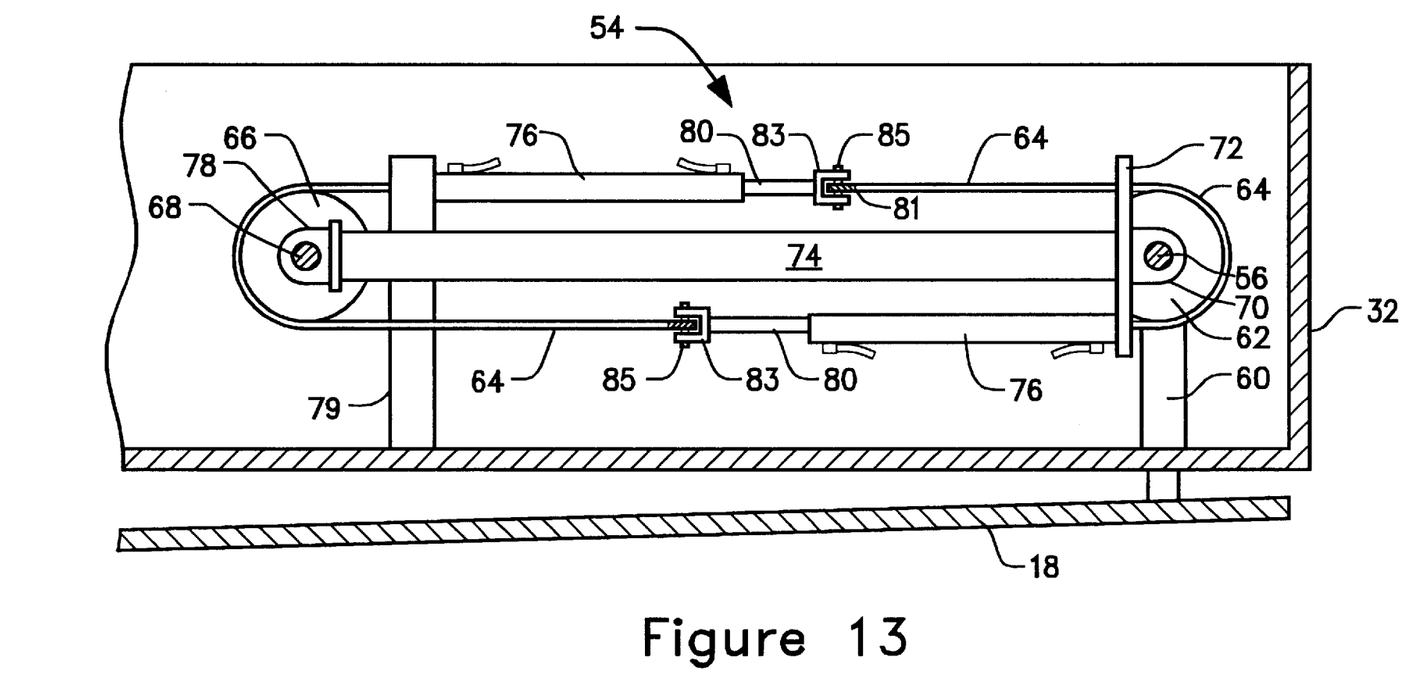
FIG. 13 is a side view similar to FIG. 7 showing an alternate arrangement of the drive cylinders.

Sometimes it may be desirable to apply a greater force in the upward direction of sector plate travel to offset the weight of the sector plate for the vertical arrangement shown or to overcome differential pressure loads which can be effected by sector plate static sealing curtains. In this case as shown in FIG. 13, the base of one of the cylinders can be located at the idler end of the support base such that both cylinders extend at the same time in the direction of maximum load and retract at the same time in the direction where load is least. In this way it is possible to reduce the required size of the cylinders for any application where there is a greater loading in one of the two directions.

Although the invention has been described with respect to an air preheater with the hot end on the top and with the drive assembly mounted on the top, the invention is equally applicable to an air preheater with the hot end and the drive assembly on the bottom. Likewise, the invention may be applied to a horizontal flow air preheater with a horizontal shaft and with the drive assembly mounted on the hot vertical end.

The present invention provides a two position drive means for the sector plates, i.e. full up or full down. This travel is provided with 180° rotation of the drive shaft. The eccentric disk system divorces the drive cylinders from any pulsating loads which result from seals sweeping the face of the sector plates during the operation of the air preheater. The drive shaft would only be subjected to bending loads during normal operation. It would be subjected to torsional loads only during the actuation of the drive assembly. The eccentric disk arrangement produces an almost infinite mechanical advantage at the extremities of the up and down travel. This has the benefit of easily breaking loose a sector plate which may be stuck at either position.

What is claimed is:

1. An improvement in a rotary regenerative air preheater having a cold axial end with an air inlet and a flue gas outlet and a hot axial end with a heated air outlet and a flue gas inlet and having hot end sector plates on said hot axial end dividing said air preheater into a flue gas sector and at least one air sector and further having a rotor with hot end radially extending seals cooperating with said hot end sector plates to form seals between said sectors and wherein said hot end sector plates and said hot end radially extending seals each have inboard portions adjacent the center of said rotor and outboard portions adjacent the periphery of said rotor and wherein said hot end radially extending seals move away from said hot end sector plates by an amount increasing from said inboard portions to said outboard portions as said air preheater progresses from a cold condition to a hot condition, said improvement comprising drive means for driving said outboard portion of each of said sector plates toward said radially extending seals in said hot condition, said drive means comprising:

a. a drive shaft;

b. at least one motion translator mounted on said drive shaft and connected to said outboard portion of said sector plate, said motion translator including eccentric means whereby rotation of said drive shaft reciprocates said motion translator and moves said outboard portion of said sector plate toward or away from said outboard portion of said rotor;

c. at least one drive wheel attached to said drive shaft and at least one idler wheel mounted in spaced relationship to said drive wheel;

d. a drive belt extending around said drive wheel and said idler wheel forming two belt portions between said drive and idler wheels; and e. a fluid drive cylinder connected to each one of said two belt portions whereby operation of said fluid drive cylinders in opposite directions moves said drive belt and rotates said drive wheel and said drive shaft to reciprocate said motion translator and move said outboard portion of said sector plate toward or away from said outboard portion of said radially extending seals.

2. An improvement as recited in claim 1 and further comprising two drive wheels attached to said drive shaft, two idler wheels, two drive belts around said two drive wheels and said two idler wheels and wherein each of said fluid drive cylinders is connected to corresponding portions of both of said drive belts.

3. An improvement as recited in claim 2 and further comprising two motion translators mounted on said drive shaft and each connected to said sector plate.

4. An improvement as recited in claim 1 wherein said drive wheel is a sprocket and said belt is a chain.

5. An improvement as recited in claim 1 wherein said fluid drive cylinders are mounted whereby one cylinder retracts as the other cylinder extends.

6. An improvement as recited in claim 1 wherein said fluid drive cylinders are mounted whereby the two cylinders retract together and extend together.

7. An improvement as recited in claim 1 wherein said motion translator comprises a mounting block connected to said sector plate and having a circular opening and a disk rotatably mounted in said circular opening of said mounting block and containing a shaft opening offset from the center of said disk, said drive shaft extending through said shaft opening and rotatably fixed to said disk.

8. An improvement as recited in claim 1 wherein said motion translator is adjustable and comprises a mounting block connected to said sector plate and having a first circular opening, a first disk rotatably mounted in said first circular opening of said mounting block and having a second circular opening offset from the center of said first disk, a second disk rotatably mounted in said second circular opening of said first disk and having a shaft opening offset from the center of said second disk, said drive shaft extending through said shaft opening whereby said first and second disk may be rotated with respect to each other and fixed in a desired position and said second disk may be rotated with respect to said shaft and fixed in a desired position to adjust the travel distance of said mounting block.

9. An improvement as recited in claim 2 wherein the connection of each of said fluid drive cylinder to corresponding portions of said drive belts comprises a connector extending between and attached to said corresponding portions of said drive belts and a pinned connection of said fluid drive cylinder to said connector midway between said drive belts.

10. A drive means for a sector plate of a rotary regenerative air preheater comprising:
   a. a drive shaft;
   b. at least one motion translator mounted on said drive shaft and connected to said sector plate, said motion translator including eccentric means whereby rotation of said drive shaft reciprocates said motion translator and moves said sector plate;
   c. at least one drive wheel attached to said drive shaft and at least one idler wheel mounted in spaced relationship to said drive wheel;
   d. a drive belt extending around said drive wheel and said idler wheel forming two belt portions between said drive and idler wheels; and
   e. a fluid drive cylinder connected to each one of said two belt portions whereby operation of said fluid drive cylinders in opposite directions moves said drive belt and rotates said drive wheel and said drive shaft to move said sector plate.

11. A drive means as recited in claim 10 and further comprising two drive wheels attached to said drive shaft, two idler wheels, two drive belts around said two drive wheels and said two idler wheels and wherein each of said fluid drive cylinders is connected to corresponding portions of both of said drive belts.

12. A drive means as recited in claim 11 and further comprising two motion translators mounted on said drive shaft and each connected to said sector plate.

13. A drive means as recited in claim 10 wherein said drive wheel is a sprocket and said belt is a chain.

14. A drive means as recited in claim 10 wherein said fluid drive cylinders are mounted whereby one cylinder retracts as the other cylinder extends.

15. A drive means as recited in claim 10 wherein said fluid drive cylinders are mounted whereby the two cylinders retract together and extend together.

16. A drive means as recited in claim 10 wherein said motion translator comprises a mounting block connected to said sector plate and having a circular opening and a disk rotatably mounted in said circular opening of said mounting block and containing a shaft opening offset from the center of said disk, said drive shaft extending through said shaft opening and rotatably fixed to said disk.

17. A drive means as recited in claim 10 wherein said motion translator is adjustable and comprises a mounting block connected to said sector plate and having a first circular opening, a first disk rotatably mounted in said first circular opening of said mounting block and having a second circular opening offset from the center of said first disk, a second disk rotatably mounted in said second circular opening of said first disk and having a shaft opening offset from the center of said second disk, said drive shaft extending through said shaft opening whereby said first and second disk may be rotated with respect to each other and fixed in position and said second disk may be rotated with respect to said shaft and fixed in position to adjust the travel distance of said mounting block.

18. A drive means as recited in claim 11 wherein the connection of each of said fluid drive cylinder to corresponding portions of said drive belts comprises a connector extending between and attached to said corresponding portions of said drive belts and a pinned connection of said fluid drive cylinder to said connector midway between said drive belts.

* * * * *